US00RE34322E

United States Patent [19]

Koon

[11] E Patent Number: Re. 34,322

[45] Reissued Date of Patent: Jul. 27, 1993

[54] PREPARATION OF HARD MAGNETIC ALLOYS OF A TRANSITION METAL AND LANTHANIDE

[75] Inventor: Norm oodridge, Va.

[73] Assignee: The United States of America as represented by the Secretary of the Navy, Washington, D.C.

[21] Appl. No.: 304,150

[22] Filed: Jan. 31, 1989

Related U.S. Patent Documents

Reissue of:

[64] Patent No.: 4,533,408
Issued: Aug. 6, 1985
Appl. No.: 529,788
Filed: Sep. 6, 1983

U.S. Applications:

[63] Continuation-in-part of Ser. No. 314,325, Oct. 23, 1981, Pat. No. 4,402,770.

[51] Int. Cl.[5] ..... H01F 1/04

[52] U.S. Cl. ..... 148/103; 148/108; 164/423; 164/427; 164/429; 164/462; 164/463; 164/479

[58] Field of Search ..... 148/101, 102, 103, 104, 148/105, 108; 164/462, 463, 479, 423, 427, 429

[56] References Cited

U.S. PATENT DOCUMENTS

| | | | |
|---|---|---|---|
| 3,982,971 | 9/1976 | Yamanaka et al. | 148/101 |
| 4,065,330 | 12/1977 | Masumoto et al. | 148/100 |
| 4,222,770 | 9/1980 | Osumi et al. | 420/443 |
| 4,402,770 | 9/1983 | Koon | 148/302 |
| 4,851,058 | 7/1989 | Croat | 148/302 |

FOREIGN PATENT DOCUMENTS

| | | | |
|---|---|---|---|
| 56-41345 | 4/1981 | Japan . | |
| 56-72153 | 6/1981 | Japan . | |
| 58-123853 | 7/1983 | Japan | 148/101 |

OTHER PUBLICATIONS

Becker, "Surface Effects in Hysteresis Loop Shapes in High-Coercive-Force Crystallized Amorphous Alloys," IEEE Trans. on Mag, vol. MAG. 18, No. 6, Nov. 1982, pp. 1451-1452.

Metallic Glasser, American Society for Metals 1978, pp. 6-9 and 31.

Norman C. Koon, "A New Class of Melt-Quenched Amorphous Alloys", abstract of talk at the 26th Annual Conference on Magnetism and Magnetic Materials in Dallas, Tex., Nov. 11-14, 1980.

Norman C. Koon et al., "Abstract: A New Class of Melt Quenched Amorphous Magnetic Alloys", printed in J. Appl. Phys. 52(3), Mar. 1981.

Norman C. Koon et al., "Magnetic Properties of Amorphous and Crystallized $(Fe_{0.82}B_{0.18})_{0.9}Tb_{0.05}La_{0.05}$", printed in Appl. Phys. Lett. 39(10), 15 Nov. 1981, pp. 840-842.

Norman C. Koon, et al., "Composition Dependence of the Coercive Force and Microstructure of Crystallized Amorphous $(Fe_xB_{1-x})_{0.09}Tb_{0.05}La_{0.05}$Alloys", printed in IEEE Transactions on Magnetics, vol. MAG-18, No. 6, Nov. 1982 pp. 1448-1450.

B. N. Das and N. C. Koon, "Correlation Between Microstructure and Coercivity of Amorphous $(Fe_{0.82}B_{0.18})_{0.90}Tb_{0.05}La_{0.05}$Alloy Ribbons", printed in Metallurgical Transactions A, vol. 14A, May 1983, pp. 953-961.

L. Kabacoff et al., "Thermal and Magnetic Properties of Amorphous $Pr_x(Fe_{0.8}B_{0.2})_{1-x}$[a]),," printed in J. Appl. Phys. 53(3), Mar. 1982, pp. 2255-2257.

*Primary Examiner*—John P. Sheehan
*Attorney, Agent, or Firm*—Thomas E. McDonnell; Barry A. Edelberg

[57] ABSTRACT

A method of preparing alloy of a transition metal and lanthanide comprising the steps of alloying a transition metal, boron, at least one lower-weight lanthanide having none or few stable compounds with iron, optionally one or more higher-weight lanthanides, a glass former, and optionally the pseudo lanthanide, yttrium; forming an amorphous or nearly amorphous metastable microstructure in the alloy; and heating the amorphous alloy to form a polycrystalline, multiphase, fine-grain single-domain structure.

26 Claims, 1 Drawing Sheet

PREPARATION OF HARD MAGNETIC ALLOYS OF A TRANSITION METAL AND LANTHANIDE

Matter enclosed in heavy brackets [ ] appears in the original patent but forms no part of this reissue specification; matter printed in italics indicates the additions made by reissue.

This is a [division] *continuation-in-part* of patent application Ser. No. 314,325, filed Oct. 23, 1981, now U.S. Pat. No. 4,402,770.

BACKGROUND OF THE INVENTION

The present invention pertains generally to hard magnetic alloys and in particular to hard magnetic alloys comprising a transition metal, boron, and one or more lathanides.

Iron alloys, including iron-boron alloys, have been used extensively as magnets both soft and hard. A hard magnetic alloy is one with a high coercive force and remanence, whereas a soft magnetic alloy is one with a minimum coercive force and minimum area enclosed by the hysteresis curve.

Permanent magnets are generally made from hard magnetic materials because a large magnetic moment can exist in the absence of an applied magnetic field. Presently, a wide variety of hard magnetic materials are known; however, all of them exhibit specific characteristics which render them suitable for some applications but not for others.

The highest-performance permanent magnets are made from rare-earth, transition-metal, intermetallic compounds such as $SmCo_5$ or alloys closely related to it. Examples of these alloys are disclosed in U.S. Pat. No. 3,558,372. These alloys have magnetic properties which are extremely good for almost every application. The disadvantages are that they contain very expensive elements. They have 34% rare earth by weight, and cobalt is a very expensive transition metal, currently in short supply. A second problem is that to get maximum performance, alloy processing of rare earth permanent magnets is very complicated. Many of the techniques to get such performance are proprietary and not generally disseminated. A third problem is that the high coercive forces are only available for a limited range of compositions, which means that the ability to change characteristics, such as saturation magnetization, are also limited.

Magnets which do not contain rare earths generally have much lower coercive forces than those of $SmCo_5$ and related alloys. The various forms of ALNICO, for example, have coercive forces in the range of 600–1400 Oe, which is low for many applications. ALNICO alloys also contain a large amount of Co, which is expensive and in short supply. The advantage of ALNICO alloys is that they do have large values of saturation magnetization.

There are other permanent-magnet materials often used. Various kinds of ferrites are available very cheaply, but generally they have both low coercive forces and low values of magnetization; so that, their main virtue is very low cost. MnAlC alloys have no cobalt or other expensive elements and are beginning to be used. There again the coercive force and performance are lower than the $SmCo_5$ class of alloys, although the cost is also lower. Cobalt-iron alloys including an addition of nickel, such as, U.S. Pat. No. 1,743,309 and 2,596,705 have hard magnetic properties, but generally do not have a large magnetic hysteresis.

SUMMARY OF THE INVENTION

It is, therefore, an object of this invention to prepare large quanties of permanent magnets easily and relatively inexpensively.

Another object is to prepare permanent magnets with a wide range of magnetic characteristics.

Another object of this invention is to prepare permanent magnets with a high coercive force.

An another object is to prepare isotropic permanent magnets with moderately high magnetization.

A further object of this invention is to prepare a permanent magnet with a wide range of permeability.

These and other objects are achieved by alloying a transition metal, boron, at least one lower-weight lanthanide having none or a few stable compounds with iron, optionally one or more higher-weight lanthanides, a glass former, and optionally the pseudo lanthanide, yttrium; forming an amorphous or nearly amorphous metastable microstructure in the alloy; and heating the amorphous alloy to form a polycrystalline, multiphase, fine-grain single-domain structure. Magnetization is imported during or after heating by exposing the alloy to a magnetic field.

DETAILED DESCRIPTION OF THE DRAWINGS

DETAILED DESCRIPTION OF THE INVENTION

Figure 1:
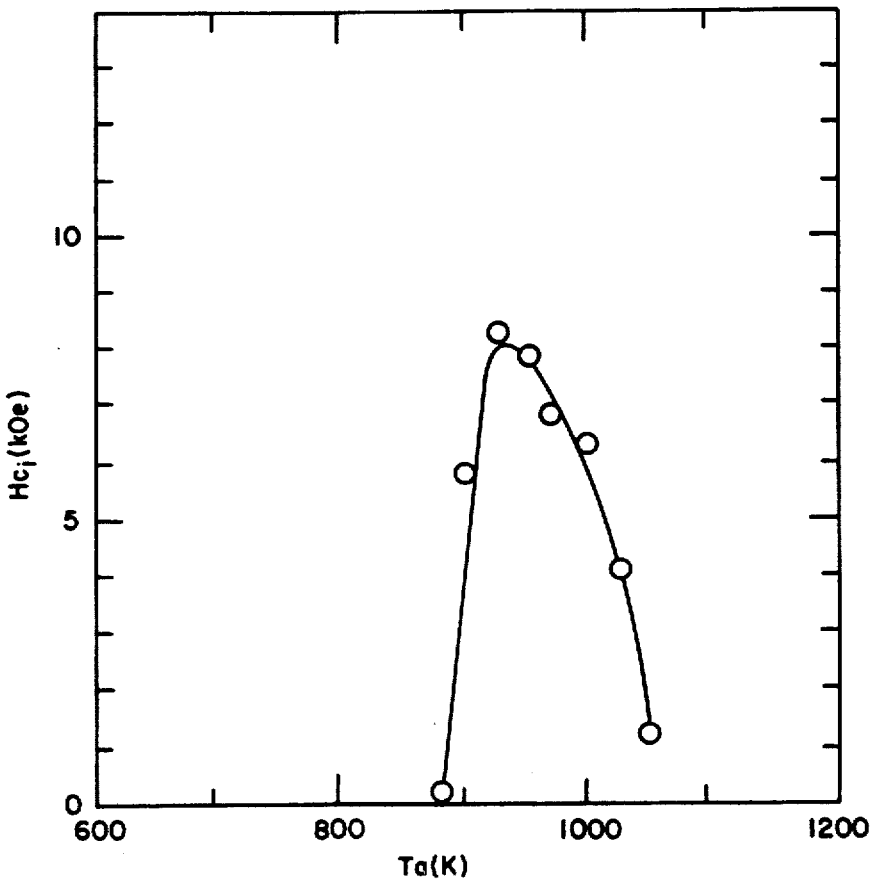
FIG. 1 shows the intrinsic coercive force of $(Fe_{0.82}B_{0.18})_{0.9}Tb_{0.05}La_{0.05}$ at 300 K. following a series of one-hour anneals at 25 K. temperature intervals.

For a transition metal-boron-lanthanide alloy to have hard magnetic properties, the alloy must have a polycrystalline, multiphase, fine-grain single-domain structure. This structure can be developed from an alloy with an amorphous or nearly amorphous metastable structure which can only be obtained from certain alloy compositions. It has been determined that amorphous or near amorphicity alloys can be obtained from a transition metal-boron-lanthanide alloys if the lanthanide constituent is at least one lower-weight light lanthanide that has few or no stable compounds with iron. These alloys can be summarized by the formula:

$$(M_wX_xB_{1-w-x})_{1-y}(Y_vR'_2L_{1-x-z})_y$$

wherein v is 0 to 0.8; w is from about 0.7 to about 0.98; x is from 0 to about 0.15; y is from about 0.05 to about 0.25; z is from 0 to about 0.95; M is selected from the class consisting of iron, cobalt, an iron-cobalt alloy, an iron-manganese alloy having at least 50 atomic percent iron, and an iron-cobalt-manganese alloy having at least 50 atomic percent iron and cobalt, X is a glass former selected from the class consisting of phosphorous, arsenic, germanium, gallium, indium, antimony, bismuth, tin, carbon, silicon, and aluminum; R' is a higher-weight lanthanide (europium or heavier), and is L is a lower-weight lanthanide selected from the group consisting of lanthanium, cerium, praseodymium, neodymium, and samarium.

The lower-weight lanthanide (L) must be present to obtain amorphicity or near amorphicity in the intermediate alloys. The lower-weight lanthanides are characterized by their ironic structure being larger than the heavier-weight lanthanides, and their reduced ability to form stable compounds with iron. In addition to promoting amorphicity in the intermediate alloys, the lanthanides appear to also promote small crystal structure in the final alloys. A transistion metal-boron-lanthanide alloy with only lanthanum is not preferred as a hard magnet because of poor magnetic properties.

Any heavier-weight lanthanide (R') can be used, but many have poor magnetic properties, are expensive, or are difficult to process. The nonpreferred lanthanides are europium, gadolinium, ytterbium, and lutetium.

Yttrium can be added for a lighter-weight lanthanide. It is often referred to a pseudo lanthanide, yttrium can be added in a relative amount (v) of up to 0.8. If it is added, the preferred relative amount is from 0.05 to 0.6.

The preferred selection of lanthanides with or without yttrium has an average molecular volume from 20.7 to 21.0 cc/mole and the most preferred combinations have a molecular volume from 20.8 to 20.95 cc/mole. In the usual case, selections involve combinations of one or more lighter-weight lanthanides with one or more heavier-weight lanthanides. Other combinations include lanthanium with one or more other lighter-weight lanthanides and yttrium with one or more lanthanides. Prelimary tests show the average molecular volume is a major factor in determining the performance of the resulting hard magnets. A substantial number of preferred alloy compositions has z from 0.2 to 0.8. If the amount of the heavier-weight lanthanide is relatively high, ie. the average molecular volume is below the preferred range, the difficulty in obtaining amorphicity can be overcome by increasing the amount of the auxiliary glass former and/or boron and carefully processing the alloy. It should be noted that these measures are successful; if, the alloy composition is within the aforesaid ranges.

Iron is the preferred metal for M. Other elements and alloys can also be used, such as cobalt, iron-cobalt alloys, and iron-manganese alloys. The preferred amount of cobalt and iron is from 0.70 to 0.86 and most preferably 0.7 to 0.8. The alloys are represented as (1) $Fe_aCo_{1-a}$ wherein a is from about 0.01 to about 0.99; and preferably from 0.7 to 0.95;

(2) $Fe_bMn_{1-b}$ wherein b is greater than 0.5 but less than 1.0 and preferably is greater than 0.7 but less than or equal to 0.95;

(3) $Fe_dCo_eMn_{1-d-e}$ wherein (d+e) is from about 0.5 to less than about 1.0 and preferably from 0.75 to 0.95 and d is greater than e and preferably is more than two times greater than e.

The auxillary glass formers increase the amount of lanthanide which can be included without eliminating the amorphous microstructure. The most common glass formers are phosphorous, silicon, arsenic, germanium, carbon, indium, antimony, bismuth, tin, and mixtures thereof. The preferred auxillary glass formers are phosphorus, silicon, and carbon. The preferred amount of auxillary glass former which can be added is from about 0 to about 0.1.

The amounts of the lanthanide with or without yttrium is from about 0.05 to about 0.22 of the total alloy and preferably is from 0.05 to 0.20. It is possible to form alloys with a lanthanum-lanthanide amount greater than 0.15, depending on the lanthanide, the relative amounts of iron and boron, the presence of a glass former, and the processing parameters.

All the amounts in a subgroup are expressed in atomic concentrations in that subgroup and not of the alloy. Only the subscript (y) represents a portion of the total alloy. For an alloy having M representing $Fe_{0.5}Co_{0.3}Mn_{0.2}$w equaling 0.7, x equaling 0, R representing neodymium, z equaling 0.5, and y equaling 0.1, then the formula for the alloy would be $((Fe_{0.5}Co_{0.3}Mn_{0.2})_{0.7}B_{0.3})_{0.9}(Nd_{0.5}La_{0.5})_{0.1}$.

The amorphous alloys from which the polycrystalline alloys are prepared can be prepared by rapidly cooling a melt having the desired composition. A cooling rate of at least about $5\times10^4$C/sec. and preferably at least $1\times10^6$C/sec.

Examples of techniques for cooling thin sections include ejecting molten alloy onto a rapidly rotating inert surface, e.g., a highly polished copper wheel, ejecting molten alloy between two counterrotating rollers, vapor deposition or electrolytic deposition on a cold surface. The preferred technique is ejecting the molten alloy onto the surface of a polished, copper wheel rotating at a rate of at least 200 rpm.

The polycrystalline alloys of this invention are prepared from the above amorphous alloys by heating the alloys in an inert atmosphere at a temperature from about 850 to about 1200 K. and preferably from 950 to 1050K. until the desired microstructure is obtained. The preferred inert atmosphere is a vacuum or argon with or without a getter, such as tantalum. The alloys can be cooled at any rate and by any method. Of course, the preferred method is to let the alloy cool to room temperature by removing the heat from the alloy. The maximum average grain size is about 400 A and preferably is from 100 to 200 A.

The alloy is magnetized either by cooling the alloy after preparation in a magnetic field of at least one kOe, preferably of at least three kOe and most preferably at least 15 kOe or by applying a magnetic field of at least about 25 kOe and preferably of at least 30 kOe after the alloy is cooled. The length of exposure to the magnetic field depends on the strength of the field and the size of the sample. It can be empirically determined by routine experimentation.

To better illustrate the present invention the following examples are given by way of demonstration and are not meant to limit this disclosure or the claims to follow in any manner.

1. Preparation of Amorphous Alloys

Amorphous alloys, from which the examples were prepared, were prepared by weighing out appropriate amounts of the elemental constituents having a nominal purity of at least 99.9 at %. The constituents were then melted together in an electric arc furnace under an atmosphere of purified Ar. Each ingot was turned and remelted repeatedly to ensure homogeneity.

A portion of each homogenized ingot was placed in a quartz crucible having a diameter of 10–11 mm. and a small orifice at the end of approximate diameter 0.35 mm. The quartz tube was flushed with Ar gas to prevent oxidation during heating. The ingot was then heated to the melting point by an induction furnace, then ejected onto a rapidly rotating copper wheel by raising the Ar pressure to about 8 psi. The copper wheel was ten inches in diameter and rotated at an approximate speed of 2500 RPM. The surface of the wheel was polished by using 600 grit emery paper for the final finish. The resulting ribbons were approximately 1 mm in width and 15 microns in thickness.

The morphous alloys are prepared in the manner described in U.S. Pat. No. 4,374,665 which is herein incorporated by reference.

2. Preparation of Polycrystalline Hard Magnetic Alloys

A ribbon (8–10mg) of one of the amorphous alloys prepared by the previous method was wrapped in Tc foil, was sealed in an evacuated 3 cc quart tube tube sealed and heated by means of a heating coil to 925K. in 16 hours in a magnetic field of 1.4 kOe. Free-standing the quartz tube cooled the sample to room temperature. After cool down the ribbon was taken out for measurement of the intrinsic coercive force.

3. Measurement of Intrinsic Coercive Force

The coercive force was measured using a vibrating sample magnetometer. The magnetic field was first applied parallel to the spontaneous moment, then raised to 15 k Oe. The moment was then measured as a function of applied field as the field was reduced, then reversed to the maximum field of the magnet, then brought back up again. The intrinsic coercive force is the reverse field required to reduce the magnetization to zero on the initial reversal. The results, along with the alloy composition are summarized in Table I.

TABLE I

| Alloy | Intrinsic Coercive Force (Oe) |
|---|---|
| $(Co_{.74}Fe_{.06}B_{.20})_{.94}Sm_{.01}$ | 930 |
| $(Co_{.74}Fe_{.06}B_{.20})_{.95}Sm_{.02}La_{.03}$ | 1120 |
| $(Fe_{.82}B_{.18})_{.95}Tb_{.03}La_{.02}$ | 3000 |
| $(Co_{.74}Fe_{.06}B_{.20})_{.94}Sn_{.03}La_{.03}$ | 1670 |
| $(Fe_{.82}B_{.18})_{.9}Tb_{.05}La_{.05}$ | 8500 |
| $(Fe_{.82}B_{.18})_{.9}Sm_{.05}La_{.05}$ | 600 |
| $(Fe_{.85}B_{.15})_{.9}Tb_{.05}La_{.05}$ | 9400 |
| $(Fe_{.88}B_{.12})_{.9}Tb_{.05}La_{.05}$ | 9600 |
| $(Fe_{.82}B_{.18})_{.9}Tb_{.06}La_{.04}$ | 8400 |

Samples of polycrystalline hard magnetic alloys were prepared by two other methods.

4. Preparation of Polycrystalline Hard Magnetic Alloy, Demonstrating the Effect of Heating on Intrinsic Coercive Force A ribbon (4–6 mg) of $Fe_{0.82}B_{0.18})_{0.9}Tb_{0.05}$ prepared by the previous method was placed inside a partially flattened thin-wall tantalum tube of about 1 mm. diameter. The tantalum tube was folded into a length of about 4 mm. The folded tantalum with the ribbon inside was sealed into one end of an evacuated quartz tube. The purpose of the tantalum was to protect the ribbon from oxidation and prevent a reaction with gases relased during heat. The tube was heated to some specific temperature for one hour, then cooled to room temperature in a small magnetic field of about 2 kOe. Upon cooling, the ribbon was tested as before. The ribbon was then heated to a temperature 25 K. higher than before, treated for one hour, then cooled and measured again. This was continued until 1100 K. was reached. The results are presented in FIG. 1. The intrinsic coercive force rises to about 8.5 kOe at an anneal temperature of 925 K., then drops rapidly at higher temperatures. The coercive force depended mainly on the highest anneal temperature rather than the detailed history of the process. For example, a 16 hour anneal at 925 K. gave a magnetization loop essentially the same the above sample.

Figure 2:
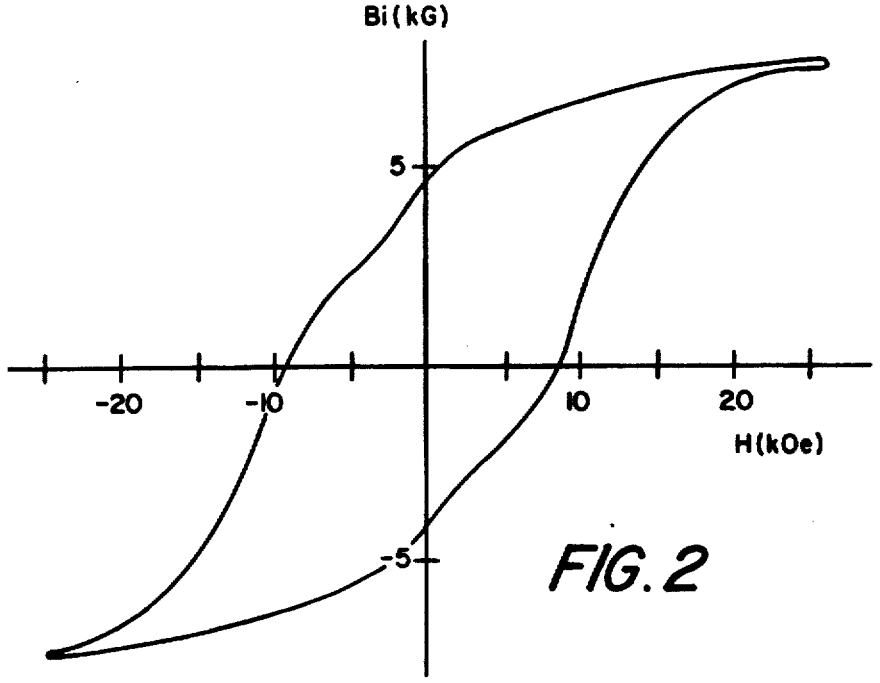
FIG. 2 shows the intrinsic magnetization for crystallized $(Fe_{0.82}B_{0.18})_{0.9}Tb_{0.05}La_{0.05}$ as a function of applied magnetic field.

In FIG. 2 a typical magnetization curve taken at 300 K. on $Fe_{0.82}B_{0.18})_{0.9}Tb_{0.05}La_{0.05}$ heat treated for 16 hours at 925 K. in a magnetic field of about two kOe is presented. The slight offset in the curve is due to a field cooling effect and disappears upon a few cycles of the field. For this alloy an intrinsic coercive force of 9 kOe, is achieved more or less independent of the details of the anneal. The one hour step anneal procedure, for example, yields an almost identical result when the maximum anneal temperature is 925 K. The shape of the magnetization curve clearly reflects the multiphase character of the sample. The amount of high coercive force phase varies somewhat from sample to sample and appears to be more sensitive to the Fe/B ratio than to the quenching procedures.

5. Preparation of Polycrystalline Hard Magnetic Alloy By a Fast Anneal At a High Temperature A small ribbon (4–6mg) of $(Fe_{0.82}B_{0.18})_{0.9}Tb_{0.25}La_{0.05}$ prepared by the previous method, was placed inside a 50 c.c. quartz tube evacuated dynamically by a diffusion pump. The tube was placed in a furnace at 1200 K. for 0.5 to 1.5 minutes. Upon cooling the ribbon was placed in magnetic field 20 kOe for thirty minutes. The intrinsic force was measured as before. A two-minute anneal at 1200 K. produced an alloy with a lower intrinsic force, indicating that a longer heating at the high temperature causes unfavorable grain growth.

6. Preparation of Amorphous Alloys Without Lanthanium

The procedure of example 1 was repeated exactly for the following alloy: $Fe_{.833}B_{0.042}Nd_{0.125}$.

7. Preparation of Polycrystalline Hard Magnetic Alloy Without Lanthanium

A ribbon (8–10 mg) of the amorphous alloy prepared by the previous method was wrapped in tantalum foil, sealed in an evacuated 3 mm-diameter quartz tube and heated by means of a heating coil to 923 K. in 16 hours in a magnetic field of 1.4 kOe. Free-standing the quartz tube cooled the sample to room temperature. After cool-down the ribbon was taken out for measurement of the intrinsic coerive force.

8. Measurement of the Intrinsic Coercive Force

The procedure of example 3 was repeated except that this magnetic field was 15 kOe.

It is clear from these data that the proposed procedure can produce potentially useful coercive behavior from a wide class of rare earth containing amorphous alloys, particularly those with La, which in a number of cases is required to make the initial alloy amorphous by melt.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of preparing a hard magnetic polycrystalline alloy which comprise the steps of preparing an alloy represented by the formula:

$$[(M_wX_xB_{1-w-x})_{1-y}(Y_vRL_{1-v-z})_y]$$
$$(M_wX_xB_{1-w-x})_{1-y}(Y_vR'_zL_{1-v-z})_y$$

wherein v is from 0 to 0.8, w is from about 0.7 to about 0.98; x is from 0 to about 0.15; y is from about 0.05 to about 0.25; z is from 0 to about 0.95; M is selected from the [class] *group* consisting of iron, cobalt, an iron-cobalt alloy, an iron-manganese alloy having at least 50 atomic percent iron, an iron-cobalt-manganese alloy having at least 50 atomic percent iron and cobalt, X is an [auxillary] auxiliary glass former selected from the [class] *group* consisting of phosphorous, silicon, aluminum, arsenic, [genmanium] *germanium*, [indinum] *indium*, antimony, bismuth, tin and mixtures thereof, R' is a heavier-weight lanthanide *selected from the group consisting of europium and lanthanides having heavier than europium and L is a lighter weight lanthanide selected from the group consisting of cerium, praseodymium, neodymium, samarium*, said alloy having a polycrystalline, multiphase, single-domain microstructure wherein the average crystal-grain size does not exceed 400 [A] Å;

creating an amorphous microstructure in said alloy; *and* heating said alloy at a temperature from about 850 to 1200 K. in a magnetic field of at least one kOe until a polycrystalline microstructure is obtained.

2. The method of claim 1 wherein said temperature is from 950 to 1025 K. and the magnetic field is at least 15 kOe.

3. The method of claim 1 wherein said amorphous alloy is heated at a temperature from about 1100 to 1200 K. for a period of time from about 15 to 120 seconds.

4. The method of claim 2 wherein M is iron and x is zero.

5. The method of claim 4 wherein R' is selected from the [class] *group* consisting of terbium, dysprosium, holmium, and erbium.

6. The method of claim 5 wherein z is from 0.4 to 0.75.

7. The method of claim 5 wherein L, R', and yttrium are selected along with the amounts thereof so that the molecular volume thereof is from 20.7 to 21.0 cc/mole.

8. The method of claim 6 wherein L, R', and yttrium are selected along with the amount thereof so that the molecular volume thereof is from 20.7 to 21.0 cc/mole.

9. The method of claim 7 wherein the molecular volume is 20.8 to 20.95 cc/mole.

10. The method of claim 8 wherein the molecular volume is 20.8 to 20.95 cc/mole.

11. The method of claim 3 wherein M is iron and x is zero.

12. The method of claim 11 wherein R' is selected from the [class] *group* consisting of terbium, dysprosium, holmium, and erbium.

13. The method of claim 12 wherein z is from 0.4 to 0.75.

14. The method of claim 12 wherein L, R', and yttrium are selected along with the amount thereof so that the molecular volume thereof is from 20.7 to 21.0 cc/mole.

15. The method of claim 13 wherein L, R', and yttrium are selected along with the amount thereof so that the molecular volume thereof is from 20.7 to 21.0 cc/mole.

16. The method of claim 14 wherein the molecular volume is 20.8 to 20.95 cc/mole.

17. The method of claim 13 wherein the molecular volume is 20.8 to 20.95 cc/mole.

18. The method of claim 2 wherein said magnetic field is at least 25 kOe.

19. The method of claim 3 wherein said magnetic field is at least 25 kOe.

20. The method of claim 4 wherein said magnetic field is at least 25 kOe.

*21. The method of claim 1 wherein z is* 0 and L is selected from the group consisting of neodymium and praseodymium.

*22. The method of claim 21 wherein L is neodymium.*

*23. The method of claim 21 wherein L is praseodymium.*

*24. The method of claim 21 wherein y is from 0.05 to 0.22.*

*25. The method of claim 21 wherein y is from 0.05 to 0.20.*

*26. A method of preparing a hard magnetic polycrystalline alloy which comprise the steps of preparing an alloy represented by the formula:*

$$(M_wX_xB_{1-w-x})_{1-y}(Y_vR'_zL_{1-v-z})_y$$

*wherein v is from 0 to 0.8, w is from about 0.7 to about 0.98; x is from 0 to about 0.15; y is from about 0.05 to about 0.25; z is from 0 to about 0.95; M is selected from the class consisting of iron, cobalt, an iron-cobalt alloy, an iron-cobalt alloy, an iron-manganese alloy having at least 50 atomic percent iron, an iron-cobalt-manganese alloy having at least 50 atomic percent iron and cobalt, X is an auxiliary glass former selected from the class consisting of phosphorous, silicon, aluminum, arsenic, germanium, indium, antimony, bismuth, tin and mixtures thereof, R' is a heavier-weight lanthanide selected from the group consisting of europium and lanthanides heavier than europium and L is a mixture of lanthanum and an amount of a lighter weight lanthanide selected from the group consisting of praseodymium and neodymium effective to enhance the magnetic properties of said alloy, said alloy having a polycrystalline, multiphase, single-domain microstructure wherein the average crystal-grain size does not exceed 400Å;*

*creating an amorphous microstructure in said alloy; and heating said alloy at a temperature from about 850 to 1200 K in a magnetic field of at least one kOe until a polycrystalline microstructure is obtained.*

* * * * *